(12) United States Patent
Yoo

(10) Patent No.: US 9,854,405 B2
(45) Date of Patent: Dec. 26, 2017

(54) MOBILE APPLICATION AND DEVICE FEATURE REGULATION BASED ON PROFILE DATA

(71) Applicant: AT&T INTELLECTUAL PROPERTY I, L.P., Atlanta, GA (US)

(72) Inventor: Kenneth Yoo, Bellevue, WA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 14/937,862

(22) Filed: Nov. 10, 2015

(65) Prior Publication Data
US 2017/0134906 A1    May 11, 2017

(51) Int. Cl.
*H04W 4/02* (2009.01)
*H04W 8/22* (2009.01)
*H04W 88/02* (2009.01)

(52) U.S. Cl.
CPC .............. *H04W 4/027* (2013.01); *H04W 8/22* (2013.01); *H04W 4/028* (2013.01); *H04W 88/02* (2013.01)

(58) Field of Classification Search
CPC ....... H04W 4/02; H04W 4/003; H04W 64/00; G06F 8/70
USPC ............ 455/456.1–3, 404.2, 414.1; 340/933, 340/936, 938, 995.28, 571, 539.22
See application file for complete search history.

(56) References Cited

U.S. PATENT DOCUMENTS

| | | | |
|---|---|---|---|
| 6,825,778 B2 * | 11/2004 | Bergan | ............. G08G 1/01 340/933 |
| 8,103,292 B2 | 1/2012 | Kelly et al. | |
| 8,527,013 B2 | 9/2013 | Guba et al. | |
| 8,565,820 B2 * | 10/2013 | Riemer | ............. H04M 1/72577 455/345 |

(Continued)

FOREIGN PATENT DOCUMENTS

| | | |
|---|---|---|
| WO | 2009014703 | 1/2009 |
| WO | 2009105666 | 8/2009 |
| WO | 2014183079 | 11/2014 |

OTHER PUBLICATIONS

Perez, Sarah. "Smartphone Makers Need to Put an End to Distracted Driving" TechCrunch, Jan. 9, 2015, published on the Internet at [http://techcrunch.com/2015/01/09/smartphone-makers-need-to-put-an-end-to-distracted-driving/], retrieved on Jun. 8, 2016, 6 pages.

*Primary Examiner* — Cong Tran
(74) *Attorney, Agent, or Firm* — Amin, Turocy & Watson, LLP

(57) ABSTRACT

A drive safety application (app) that is controls other mobile app(s) and/or functionality of a communication device is centrally regulated via a network device. A manual override instruction can be provided to the network device by an authorized subscriber (e.g., via an online portal) and accordingly, the network device can instruct the communication device to disable the drive safety app. Profiling data is collected from various sources, such as, but not limited to, device sensors, location calculators, a vehicle's onboard diagnostic system (e.g., OBD2) sensors (e.g., via wireless link), scanned access points, etc. The profiling data can be utilized to calibrate device sensors of the communication device and to determine a location and/or context of the user.

(Continued)

Further, a set of the mobile apps can be disabled/enabled based on an analysis of the location and/or context.

20 Claims, 13 Drawing Sheets

(56) References Cited

U.S. PATENT DOCUMENTS

| | | |
|---|---|---|
| 8,706,143 B1 | 4/2014 | Elias |
| 8,712,628 B1 | 4/2014 | Hart |
| 8,750,853 B2 | 6/2014 | Abramson et al. |
| 8,787,936 B2 | 7/2014 | Tibbitts et al. |
| 8,942,692 B2 | 1/2015 | Randazzo et al. |
| 8,971,927 B2 | 3/2015 | Zhou |
| 8,989,955 B1 | 3/2015 | Hart |
| 8,994,492 B2 | 3/2015 | Farhan et al. |
| 9,020,482 B2 | 4/2015 | Jones |
| 9,088,572 B2 | 7/2015 | Ricci |
| 9,094,533 B2 | 7/2015 | Geyer et al. |
| 9,112,853 B2 | 8/2015 | Qureshi |
| 9,124,703 B2 | 9/2015 | Tadayon et al. |
| 9,159,167 B2 * | 10/2015 | Tuukkanen ............ G06F 3/0482 |
| 9,188,451 B2 * | 11/2015 | Magnusson ............ G01C 21/30 |
| 2010/0066688 A1* | 3/2010 | Jeon ....................... G06F 3/017 |
| | | 345/173 |
| 2011/0076996 A1 | 3/2011 | Burton et al. |
| 2012/0072055 A1 | 3/2012 | Barlsen et al. |
| 2012/0115413 A1 | 5/2012 | Czaja et al. |
| 2012/0176232 A1 | 7/2012 | Bantz et al. |
| 2012/0289217 A1* | 11/2012 | Riemer ............. H04M 1/72577 |
| | | 455/418 |
| 2014/0155052 A1 | 6/2014 | Glover |
| 2014/0274023 A1 | 9/2014 | Rajeevalochana et al. |
| 2014/0364153 A1 | 12/2014 | Ren |
| 2014/0365030 A1 | 12/2014 | Stacy |
| 2014/0370869 A1 | 12/2014 | Naqvi |
| 2015/0011203 A1 | 1/2015 | Schrader et al. |
| 2015/0084761 A1 | 3/2015 | Bailey et al. |
| 2015/0148018 A1 | 5/2015 | Rose et al. |
| 2015/0149042 A1* | 5/2015 | Cooper ................ B60R 16/037 |
| | | 701/48 |
| 2015/0195399 A1 | 7/2015 | Way et al. |
| 2015/0213555 A1 | 7/2015 | Barfield, Jr. et al. |
| 2015/0312863 A1* | 10/2015 | Shen ...................... G01S 19/34 |
| | | 455/574 |
| 2015/0363612 A1* | 12/2015 | Li ....................... G06F 21/6263 |
| | | 726/26 |
| 2017/0089717 A1* | 3/2017 | White ................ G01C 21/3658 |

\* cited by examiner

MOBILE APPLICATION AND DEVICE FEATURE REGULATION BASED ON PROFILE DATA

TECHNICAL FIELD

The subject disclosure relates to wireless communications, e.g., to a mobile application and device feature regulation based on profile data.

BACKGROUND

Each year, a staggering number of traffic accidents are caused by distracted drivers. Oftentimes, drivers interact with communication devices (e.g., mobile phones) while driving a vehicle, for example, to access various applications such as text messaging, media content sharing, and/or internet browsing. A few conventional mobile applications (apps) or hardware modules are designed to disable the mobile device's interaction with user by using inputs from a car's onboard diagnostic system connection (e.g., OBD2). These apps are limited to a small number of new vehicles that are equipped with an ignition disable feature. Other conventional mobile apps are not centrally regulated and can be easily disabled by a driver, for example, by a manual override instruction input via a keypad/touchscreen of the mobile device.

DETAILED DESCRIPTION

Figure 1:
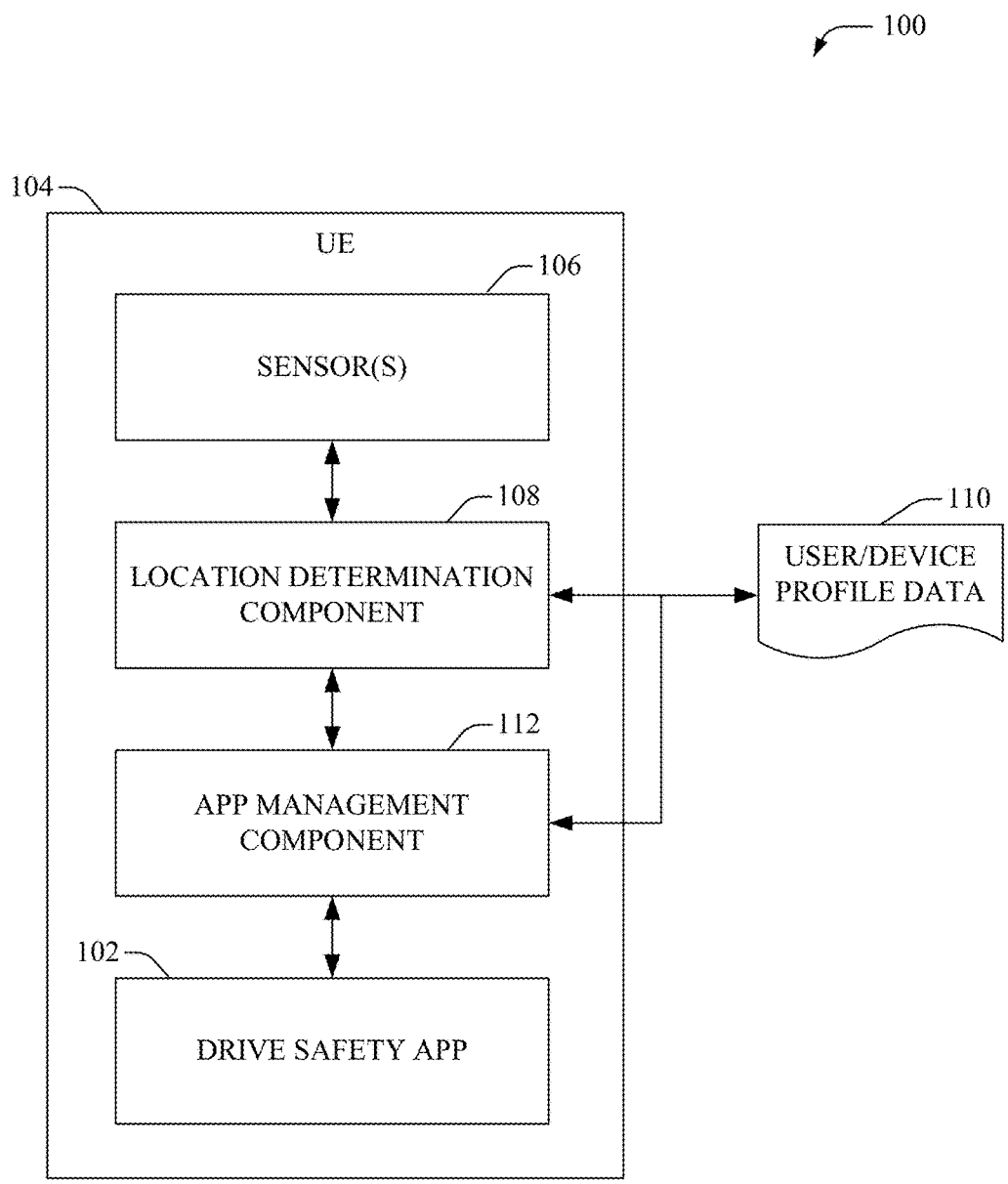
FIG. 1 illustrates an example system that facilitates application management for driver safety.

One or more embodiments are now described with reference to the drawings, wherein like reference numerals are used to refer to like elements throughout. In the following description, for purposes of explanation, numerous specific details are set forth in order to provide a thorough understanding of the various embodiments. It may be evident, however, that the various embodiments can be practiced without these specific details, e.g., without applying to any particular networked environment or standard. In other instances, well-known structures and devices are shown in block diagram form in order to facilitate describing the embodiments in additional detail.

As used in this application, the terms "component," "module," "system," "interface," "node," "platform," "server," or the like are generally intended to refer to a computer-related entity, either hardware, a combination of hardware and software, software, or software in execution or an entity related to an operational machine with one or more specific functionalities. For example, a component may be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or API components.

Further, the various embodiments can be implemented as a method, apparatus, or article of manufacture using standard programming and/or engineering techniques to produce software, firmware, hardware, or any combination thereof to control a computer to implement one or more aspects of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms like "user equipment," "communication device," "mobile device," "mobile station," and similar terminology, refer to a wired or wireless communication-capable device utilized by a subscriber or user of a wired or wireless communication service to receive or convey data, control, voice, video, sound, gaming, or substantially any data-stream or signaling-stream. The foregoing terms are utilized interchangeably in the subject specification and related drawings. Data and signaling streams can be packetized or frame-based flows. Aspects or features of the disclosed subject matter can be exploited in substantially any wired or wireless communication technology; e.g., Universal Mobile Telecommunications System (UMTS), WiFi, Worldwide Interoperability for Microwave Access (WiMAX), General Packet Radio Service (GPRS), Enhanced GPRS, Third Generation Partnership Project (3GPP) Long Term Evolution (LTE), Third Generation Partnership Project 2 (3GPP2) Ultra Mobile Broadband (UMB), High Speed Packet Access (HSPA), Zigbee, or another IEEE 802.XX technology, Fifth generation (5G), etc. Additionally, substantially all aspects of the disclosed subject matter can be exploited in legacy (e.g., wireline) telecommunication technologies.

Furthermore, the terms "user," "subscriber," "consumer," "driver," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms), which can provide simulated vision, sound recognition and so forth.

The systems and methods disclosed herein, in one aspect, relate to regulating a drive safety client/application (app) that is permanently installed on a communication device as other native clients, such as phone dialer or text app. The drive safety client/app controls other app(s) and/or functionality of the communication device. Moreover, the apps and/or functionality can be disabled by the drive safety app when detected that the communication device is in motion and/or the user is driving a vehicle. The system receives data from various sources, such as, but not limited to, device sensors, location calculators, a vehicle's onboard diagnostic system (e.g., OBD2) sensors (e.g., via wireless link), scanned access points, etc. In addition, the system receives user/device profile data received via a network application program interface (API) (e.g., via cellular network connections). The user/device profile can include real-time/dynamic information that is updated based on user location and/or time. The received data is analyzed to determine a location and/or context of the user. Further, the drive safety app can be controlled based on the analyzed data. For example, a set of apps can be disabled, if determined that the user is driving the vehicle. The network API serves as a primary encryption/authentication for enabling the drive safety app such that the driver cannot override or turn off the drive safety app (e.g., while driving a vehicle).

Referring initially to FIG. 1, there illustrated is an example system 100 that facilitates application management for driver safety, according to one or more aspects of the disclosed subject matter. System 100 comprises a drive safety application (app) 102 that is installed on a user equipment (UE) 104 to prevent distracted driving. As an example, the UE 104 can include most any electronic communication device such as, but not limited to, most any consumer electronic device, for example, a tablet computer, a digital media player, a digital camera, a cellular phone, a personal computer, a personal digital assistant (PDA), a smart phone, a laptop, a wearable device (e.g., smart watch, connected glasses, wrist monitor, etc.), a gaming system, etc. Further, it is noted that UE 104 can be mobile, have limited mobility and/or be stationary.

In one aspect, the drive safety app 102 is a native app that is pre-installed on the UE 104, for example, by the service provider or device manufacturer. For example, the drive safety app 102 can be part of the operating system of the UE 104. In another aspect, the drive safety app 102 can be downloaded and installed via an over-the-air (OTA) transmission (e.g., during setup, initialization, and/or power-up of the UE 104). Moreover, the drive safety app 102 can be managed by a central regulation entity and disabling and/or uninstalling the app 102 via the UE's user interface (e.g., touch screen, keypad, etc.) can be prohibited. Typically, the drive safety app 102 can be employed to temporarily disable/deactivate a set of apps of the UE 104, for example, when determined that the UE 104 is in motion or user of UE 104 is driving a vehicle.

According to an embodiment, sensor(s) 106 can monitor and collect device information associated with the UE 104 that can be utilized by the drive safety app 102 for app management. The sensor(s) 106 can include most any device sensors, such as, but not limited to, an accelerometer, gyroscope, barometer, pressure sensor, humidity sensors, thermal sensors, etc. In addition, sensor(s) 106 can include communication sensors such as, but are not limited to, a Global Positioning System (GPS) sensor that communicates with GPS satellites, a onboard diagnostics (OBD) connect sensor that communicates with connected vehicle, a transceiver (e.g., WiFi, cellular radio, Bluetooth®, etc.) that communicates with and/or scans for various access point devices. In a aspect, a location determination component 108 can utilize the sensed data to determine a location (and/or context) of a user. Additionally or alternatively, the location determination component 108 can utilize user/device profile data 110 associated with the user and/or the UE 104 to facilitate location and/or context determination. The user/device profile data 110 can include historical data and/or trends determined based on one or more machine learning techniques and/or manual data entry. As an example, not only can the location determination component 108 identify a geographical location (e.g., latitude/longitude) of the UE 104, but can also determine additional information, such as, but not limited to, speed, motion, orientation, physical address, and the like. Further, areas/zones that provide additional context can be identified. For example, the location determination component 108 can determine that the user is at home, at work, at a restaurant, at a movie theatre, in a passenger seat, in a driver seat, driving in a car, riding the bus, waiting at the bus stop, walking, etc.

In one aspect, an app management component 112 can analyze the location data and/or context data to determine whether the drive safety app 102 is to be enabled or disabled. If determined, based on the location data and/or context data, that the UE 104 is to be regulated, the drive safety app 102 can be (or can remain) enabled; otherwise, the drive safety app 102 can be disabled. As an example, if determined that the user is driving a vehicle and is to be regulated, the drive safety app 102 can be enabled. In addition, the app management component 112 can determine a time period during which the drive safety app 102 is to remain enabled/disabled. When the drive safety app 102 is enabled, a set of apps and/or device functionality can be enabled/disabled. For example, a text messaging app, video player app, internet browsing app, etc. can be disabled, while a navigation app can remain enabled.

Although, the systems and methods disclosed herein are described with reference to a drive safety app 102 that can be employed to prevent use of communication devices while driving, it is noted that the subject specification is not that limited and can be implemented/utilized in various applications. For example, the drive safety app 102 can be utilized to implement parental control in limiting a time period during which apps that can be utilized by a child (e.g., at school, during classes, etc.). In another example, the drive safety app 102 can be utilized to implement to customize and/or limit apps that are active during a certain time period or at a certain location to conserve battery power and/or reduce costs associated with network usage.

Figure 2:
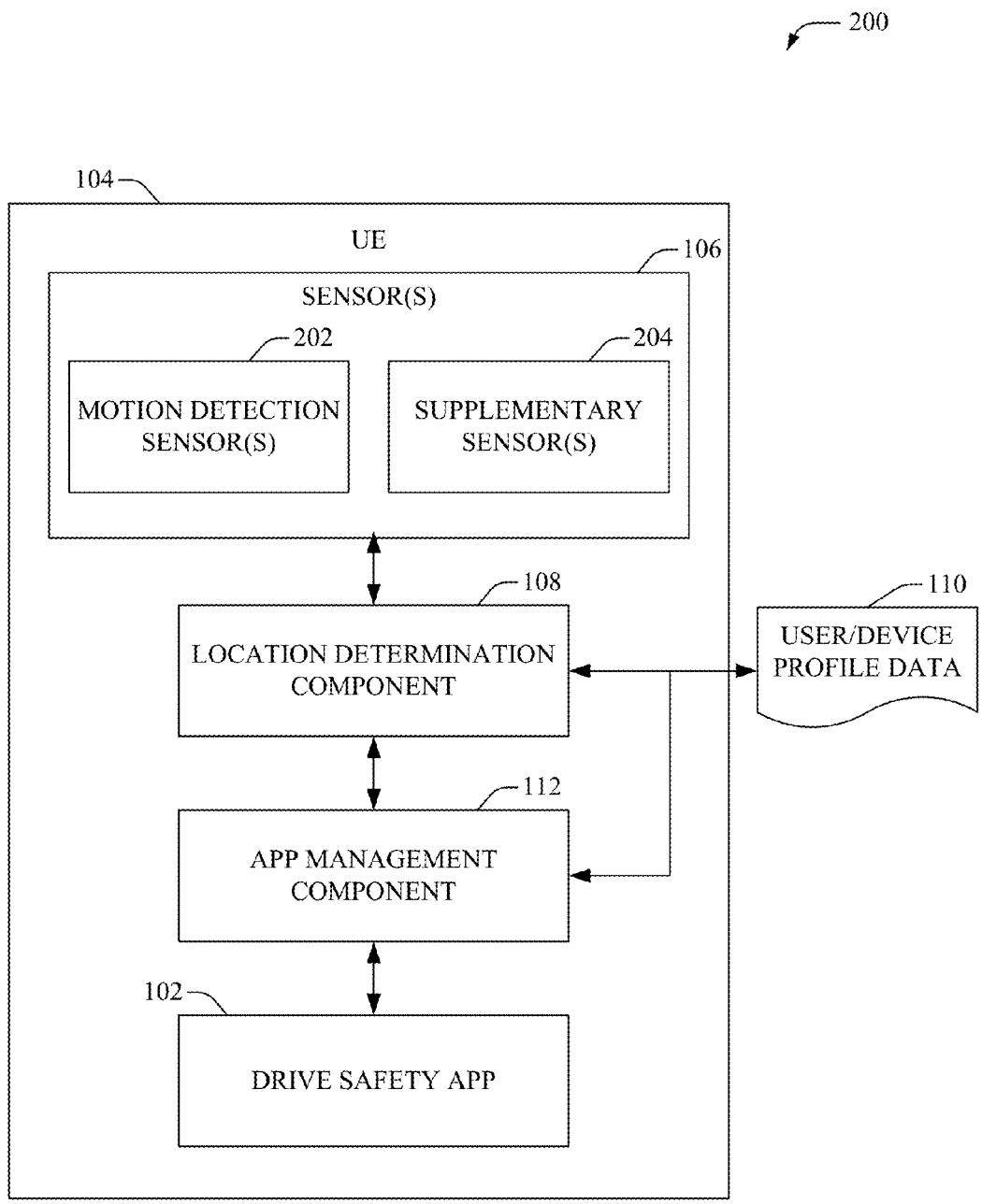
FIG. 2 illustrates an example system for sensing location-related data, according to an aspect of the subject disclosure.

Referring now to FIG. 2, there illustrated is an example system 200 for sensing location-related data, in accordance with an aspect of the subject disclosure. In one aspect, sensors(s) 106 track motion and/or context data that can be utilized to determine a location of the UE 104 and/or user behavior. It is noted that the drive safety app 102, UE 104, sensors 106, location determination component 108, user/device profile data 110, and app management component 112 can include functionality as more fully described herein, for example, as described above with regard to system 100.

Motion detection sensors 202 can include, but are not limited to, device sensors that measure speed, elevation, pressure, position, orientation, etc. of UE 104. For example, motion detection sensors 202 can include an accelerometer, a gyroscope, a barometer, a pressure sensor, etc. Optionally or additionally, UE 103 can include supplementary sensors 204 that receive addition location/context information from external devices (not shown). For example, supplementary sensors 204 can include a GPS sensor that communicates with GPS satellites, an OBD connect sensor that communicates with a OBD system of a vehicle, wired or wireless communication radios, such as, but not limited to, a radio frequency (RF) transceiver, a WiFi transceiver, a Bluetooth transceiver, a near field communication (NFC) transceiver, etc. Typically, motion detection sensors 202 are device sensors embedded within the UE 104 that do not communicate with external systems/devices for receiving measurement data, unlike the supplementary sensors 204. Moreover, data is sensed measured by an external system and then received via the supplementary sensors 204.

According to an aspect, the motion detection sensors 202 can be calibrated (e.g., during a learning phase) such that location and/or context data can be determined even when sensed data is not available from the supplementary sensors 204. In one example, during a learning phase, the location determination component 108 can receive and analyze data sensed by motion detection sensors 202 and/or the supplementary sensors 204 to determine location and/or context associated with the UE 104. Moreover, the data sensed by the supplementary sensors 204 can be utilized to calibrate the motion detection sensors 202 such that subsequent location and/or context determination can be performed using data sensed only by the motion detection sensors 202 (and optionally, a portion of the supplementary sensors 204).

The app management component 112 can utilize the location and/or context data (along with manually entered instructions by an authorized user received from a network server) to determine whether the drive safety app 102 is to be disabled/deactivated. Additionally, the apps/features controlled by the drive safety app 102 can be customized by the app management component 112. In one aspect, during the learning phase, the data determined by the location determination component 108 and/or the app management component 112 can be employed to populate the user/device profile data 110. Subsequently, the user/device profile data 110 can be utilized to facilitate app management. In an example, the sensors 106 can continuously monitor and collect (e.g., via background processes) sensor data to periodically update the user/device profile data 110.

In one example scenario, the accelerometer can sense that the UE 104 is traveling at a high speed and the OBD connect sensor can receive data from a vehicle that the user is located within. Given this data, the app management component 112 can determine that the user is driving a vehicle and enable the drive safety app 102 to deactivate a set of apps of UE 104 (e.g., to prevent distracted driving). A manual override can be performed by a primary account user via a network device (e.g., cloud server) to prevent disabling and/or enable the drive safety app 102. Over time, the app management component 112 can learn and predict user behavior and/or preferences to reduce the manual intervention. In an aspect, the learned user behavior and/or preferences can be utilized to create/populate a user/device profile data 110, which in turn can be utilized by the app management component 112 for subsequent determinations of when and which apps are to be disabled.

Figure 3:
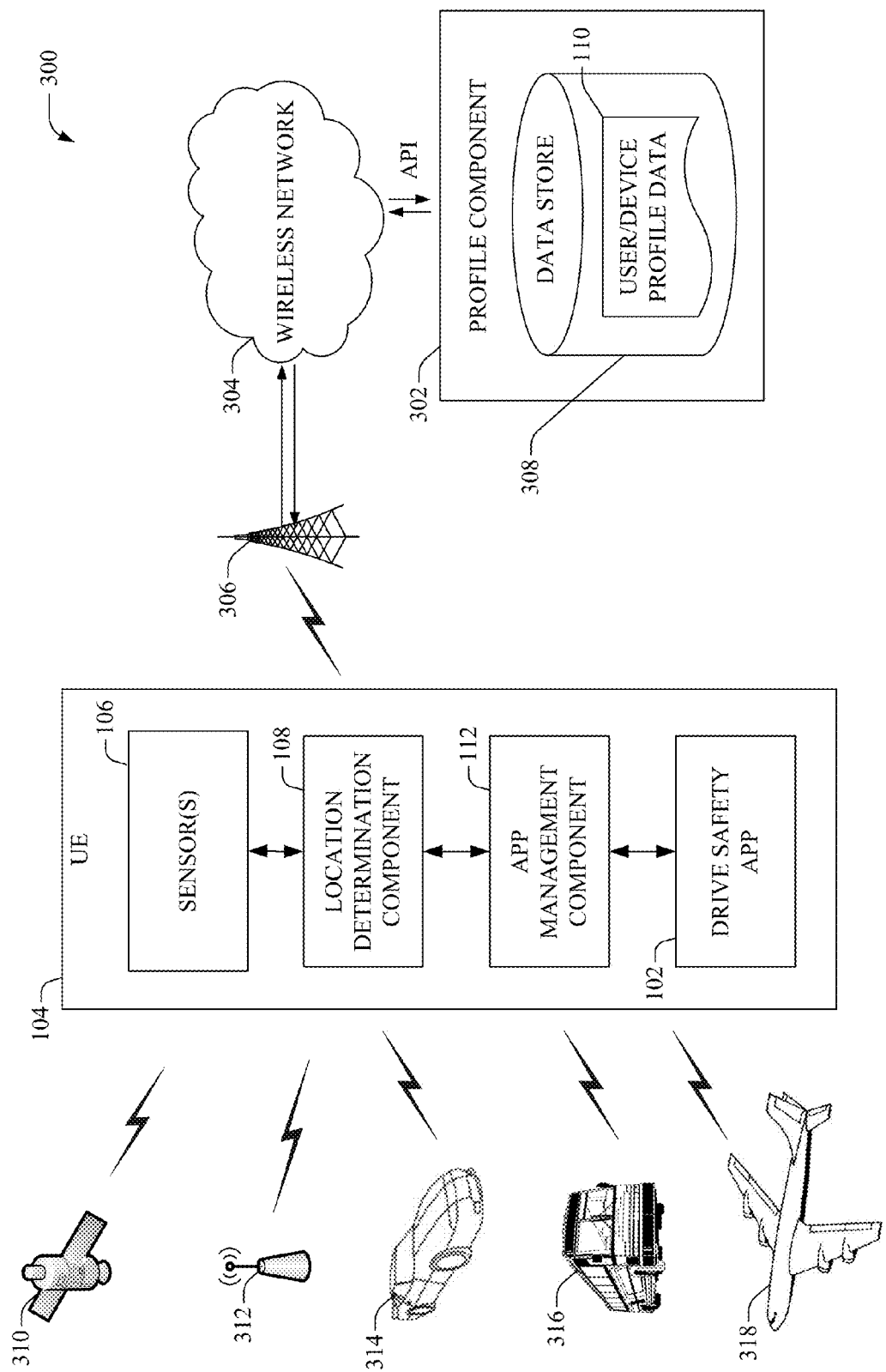
FIG. 3 illustrates is an example system that facilitates utilization of profile data for controlling a drive safety app.

Referring now to FIG. 3, there illustrated is an example system 300 that facilitates utilization of profile data for controlling a drive safety app, according to an aspect of the subject disclosure. As part of a learning/initialization stage, user/device profile data 110 is populated and/or updated. Subsequently, the user/device profile data 110 can be employed by the UE 104 (e.g., by the location determination component 108 and app management component 112) to autonomously determine whether the drive safety app 102 is to be regulated and/or select apps that are to be temporarily disabled/enabled. It is noted that the drive safety app 102, UE 104, sensors 106, location determination component 108, user/device profile data 110, and app management component 112 can include functionality as more fully described herein, for example, as described above with regard to systems 100 and 200.

In an aspect, the app management component 112 can query a profile component 302 to determine whether the apps of UE 104 are to be regulated. The profile component 302 can be implemented via one or more servers of a communication network, for example, wireless network 304. As an example, the wireless network 304 can include a cellular network. The query can be transmitted when the UE 104 in response to an event such as, but not limited to, the UE 104 being switched on, the UE 104 determined to be moving, when the UE 104 couples to access point 306, and/or registers with the wireless network 304, etc. The query can include the UE's identifier and/or various other parameters, such as, but not limited to, time of day, location, etc. In one aspect, the profile component 302 can retrieve user/device profile data 110 corresponding to the UE 104 (or user) and transmit the user/device profile data 110 (or a portion thereof) to the UE 104. The app management component 112 can utilize the user/device profile data 110 (e.g., alone or in combination with the location and/or context data determined by the location determination component 108) to decide whether the apps of the UE 104 are to be regulated. In another aspect, the profile component 302 can instruct the app management component 112 to regulate the apps. As an example, a primary user (e.g., father) can instruct the system to regulate a child's phone; however, his wife's phone can remain unregulated.

If determined that the UE 104 is not to be regulated, the drive safety app 102 can be disabled. Alternatively, if determined that the UE 104 is to be regulated, the app management component 112 can analyze information determined by the location determination component 108 and enable/disable the drive safety app 102 based on a result of the analysis. The location determination component 108 can collect information from various sources, e.g., via sensors 106. As discussed in detail with respect to system 200, the supplementary sensors 204 can be utilized to calibrate the motion detection sensors 202. The supplementary sensors 204 can include transceivers coupled to various external devices, for example, a GPS satellite 310, an access point 312 (e.g., WiFi access point, Bluetooth® beacon, femto access point, pico station, etc.), a vehicle such as a sedan 314, a bus 316, and/or an airplane 318. The supplementary sensors 204 can collect profiling information including location data from the GPS satellite 310, identifier and/or location data based on scanning and/or communicating with the access point 312, vehicle information (e.g., make/model, onboard navigational data, real-time dash camera images/video, etc.) from the sedan 314, bus 316 and/or airplane 318. Further, additional profiling information such as routes and/or schedule (e.g., arrival/departure time, taxing time, etc.) can also be requested from the vehicles 314, 316, and/or 318. Furthermore, the profiling information can include device data related to the sensors 106, for example, hardware/chipset identifiers, capabilities, features, etc. The profiling information can be transmitted to the profile component 302 and utilized by the profile component 302 to determine user behavior, patterns, and/or trends that can be stored as the user/device profile data 110 within data store 308. Typically, users can opt-in to authorize collection and/or transmission of the profiling data by adjusting appropriate privacy settings.

As an example, based on the profiling data, e.g., motion data and data from the bus 316's WiFi hotspot, the profile component 302 can determine that the user rides the bus 316 to school on weekdays between 8-8:30 AM. Accordingly, even if the WiFi information (or data from any of the supplementary sensors 204) is not available at a later time, the app management component 112 can utilize the user/device profile data 110 (alone or in combination with data sensed by the motion detection sensor 202) to facilitate app control. Moreover, based on an analysis of the user/device profile data 110, the app management component 112 can determine a probability that an app is to be disabled and disable the app in response to the probability satisfying a defined criterion (e.g., exceeding a defined threshold).

In one aspect, the user/device profile data 110 can be utilized to implement motion calibration. Typically, different devices can report different readings for two different cars traveling at the same speed based on road conditions and/or vehicle type. For example, a sedan's motions can be different from a full size pick-up truck's motion. Further, motion sensors in two separate devices can report different reading in the same vehicle. The app management component 112 can set up different thresholds to compensate the differences for various cars and devices. In an example scenario, the app management component 112 can enable the drive safety app 102 if determined that the user is driving downhill in a full size pick-up truck with a heavy load at 30 miles per hour (mph) but disable the drive safety app 102 if determined that the user is driving a sedan on a flat road at 30 mph. According to an aspect, profiling data can be employed to associate sensor readings, such as accelerometer measurements, with device hardware. For example, the profiling data can be analyzed to determine based on the accelerometer measurements that the UE 104 is a Samsung cellular phone traveling in a Ford pick up truck.

Although depicted as residing completely within the UE 104, at least a portion of the location determination component 108 and/or the app management component 112 can reside within a network (e.g., wireless network 304), for example, a cloud. As an example, a cloud can include resources (e.g., processing resource(s), data storage resource(s), etc.) that can reside on-premise or off-premise at a service provider location. Moreover, the cloud can be, but is not limited to, a public cloud, a private cloud, an inter-cloud, or a hybrid cloud.

It is noted that the data store 308 can include volatile memory(s) or nonvolatile memory(s), or can include both volatile and nonvolatile memory(s). Examples of suitable types of volatile and non-volatile memory are described below with reference to FIG. 12. The memory (e.g., data stores, databases) of the subject systems and methods is intended to comprise, without being limited to, these and any other suitable types of memory. Further, although depicted as residing completely within the profile component 302, it is noted that the data store 308 can partially reside within the profile component 302 and/or be locally (or remotely) coupled to the profile component 302.

Figure 4:
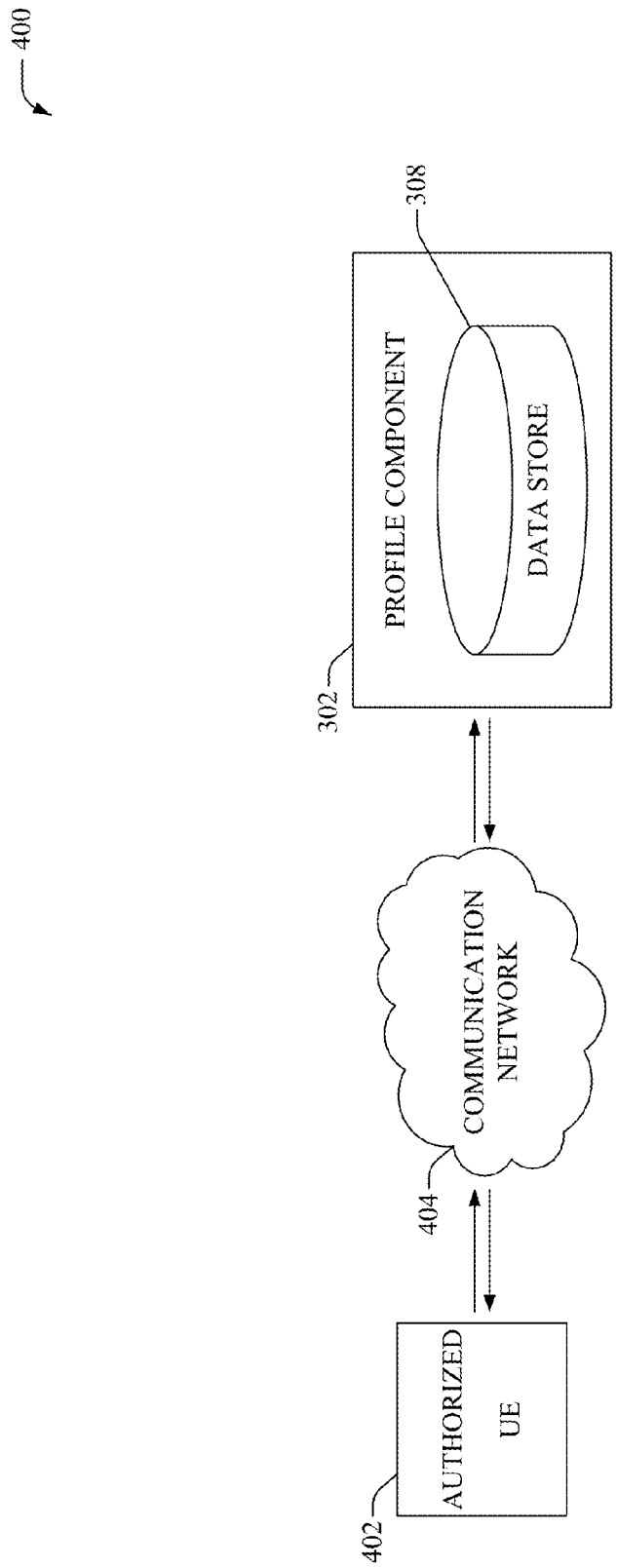
FIG. 4 illustrates an example system that central regulation of drive safety application installed on a communication device.

FIG. 4 illustrates an example system 400 that facilitates central regulation of drive safety app installed on a communication device, according to an aspect of the disclosed subject matter. Moreover, the drive safety app cannot be regulated from a local interface (e.g., keypad, touch screen, mouse, etc.) of the communication device. Override instructions and/or manual entry of user/device preferences can be received only from an authorized UE 402. In one aspect, UE 402 can access the profile component 302 via most any communication network 404, including, but not limited to wireless network 304. Prior to entry of the instructions or preferences, an authentication process can be performed by the profile component 302, for example, by utilizing most any authentication mechanisms (e.g., passwords, passkeys, biometric data, etc.). In one example, the authentication can be performed as part of an authentication and/or registration of UE 402 with the communication network 404. It can be noted that the profile component 302 and data store 308 can include functionality as more fully described herein, for example, as described above with regard to system 300.

In an aspect, a primary account subscriber, via UE 402, can access the data store 308 to manage user/device profile data of all the secondary account subscribers linked to his/her account. As an example, the primary account subscriber can access the data store 308 via an online portal (e.g., website) or a dedicated app installed on the UE 402. In one aspect, the primary account subscriber can provide a manual override instruction to enforce or prohibit regulation of a drive safety app (e.g., drive safety app 102) installed on secondary account subscriber's UE (e.g., UE 104). Additionally or alternatively, the primary account subscriber can populate and/or update a user/device profile data of the secondary account subscriber. This data can be utilized by the secondary account subscriber's UE for app management. It is noted that the instructions provided by the primary account subscriber via UE 402 are not limited to data for managing the drive safety app, but can also include instruction and/or criteria for controlling other device apps and/or features. For example, specified apps on the secondary user's UE can be disabled during specified hours of the day, during specified events, and/or at specified locations (e.g., disabling instant messaging, social media apps, or browsing during school hours or employee's working hours). In another example, home automation apps can be controlled, for example, the profile component 302 can lower the garages and arm the alarm when driver is away from home. In yet another example, the data can be employed to customize the apps on the secondary user's UE that can be disabled to conserve device battery (e.g., disabling an app that scans for nearby coffee shops, when determined that user is on a boat).

Initially, user intervention to populate/update the user/device profile data can be performed, for example, during a learning phase. The user/device profile data would evolve over time as more trending inputs/record and data are added to it from device sensors and would serve users in various user scenarios with minimal (or no) authorized user interventions.

Figure 5:
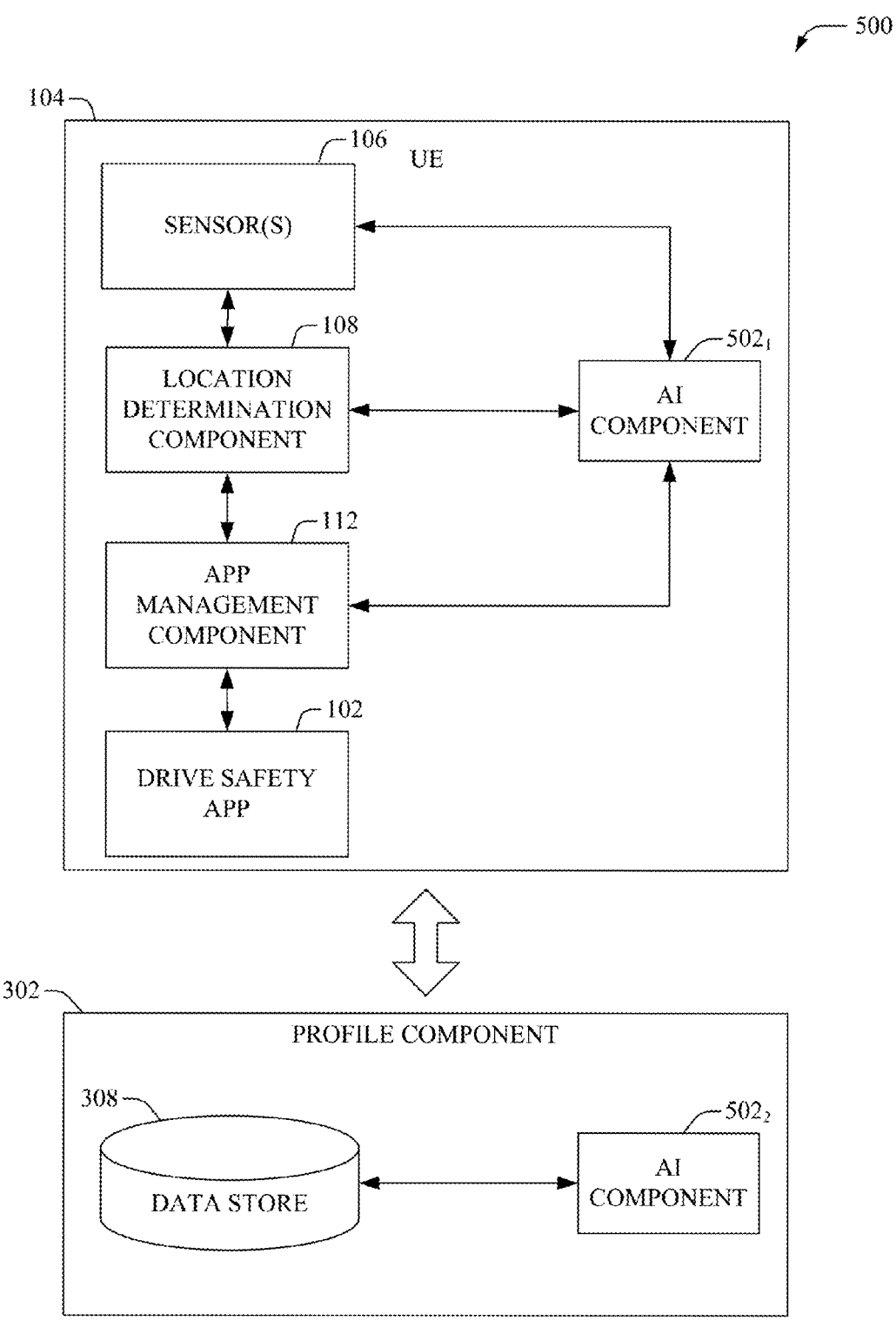
FIG. 5 illustrates an example system that facilitates automating one or more features in accordance with the subject embodiments.

Referring now to FIG. 5, there illustrated is an example system 500 that employs artificial intelligence (AI) components ($502_1$, $502_2$) to facilitate automating one or more features in accordance with the subject embodiments. It can be noted that the drive safety app 102, UE 104, sensors 106, location determination component 108, app management component 112, profile component 302, and data store 308 can include functionality as more fully described herein, for example, as described above with regard to systems 100-400.

In an example embodiment, system 400 (e.g., in connection with automatically regulating UE apps) can employ various AI-based schemes (e.g., intelligent processing/analysis, machine learning, etc.) for carrying out various aspects thereof. For example, a process for determining when to enable the drive safety app, when to disable the drive safety app, a time period during which an app is enabled/disabled, a customized set of apps that are to be controlled when the UE is at a specified location, calibration of sensors 106, etc. can be facilitated via an automatic classifier system implemented by AI components $502_1$ and/or $502_2$. Moreover, the AI components $502_1$ and $502_2$ can various exploit artificial intelligence (AI) methods or machine learning methods. Artificial intelligence techniques can typically apply advanced mathematical algorithms—e.g., decision trees, neural networks, regression analysis, principal component analysis (PCA) for feature and pattern extraction, cluster analysis, genetic algorithm, or reinforced learning—to a data set. In particular, AI components $502_1$ and $502_2$ can employ one of numerous methodologies for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Further, advanced AI and mathematical techniques can be employed to predict user context and/or behavior and accordingly customize the apps that can be enabled/disabled.

As will be readily appreciated from the subject specification, an example embodiment can employ classifiers that are explicitly trained (e.g., via a generic training data) as well as implicitly trained (e.g., via observing vehicle motion, vehicle behavior, user/operator preferences, historical information, receiving extrinsic information, type of vehicle, type of sensors, etc.). For example, SVMs can be configured via a learning or training phase within a classifier constructor and feature selection module. Thus, the classifier(s) of AI components $502_1$ and/or $502_2$ can be used to automatically learn and perform a number of functions, including but not limited to determining according to a predetermined criteria, user context, user location, a time period to enable/disable apps, etc. The criteria can include, but is not limited to, historical patterns and/or trends, UE behavior, user preferences, service provider preferences and/or policies, location of the UE 104, motion of the UE 104, data sensed by sensors 106, current time/date, and the like.

FIGS. 6-9 illustrate flow diagrams and/or methods in accordance with the disclosed subject matter. For simplicity of explanation, the flow diagrams and/or methods are depicted and described as a series of acts. It is to be understood and appreciated that the various embodiments are not limited by the acts illustrated and/or by the order of acts, for example acts can occur in various orders and/or concurrently, and with other acts not presented and described herein. Furthermore, not all illustrated acts may be required to implement the flow diagrams and/or methods in accordance with the disclosed subject matter. In addition, those skilled in the art will understand and appreciate that the methods could alternatively be represented as a series of interrelated states via a state diagram or events. Additionally, it should be further appreciated that the methods disclosed hereinafter and throughout this specification are capable of being stored on an article of manufacture to facilitate transporting and transferring such methods to computers. The term article of manufacture, as used herein, is intended to encompass a computer program accessible from any computer-readable device or computer-readable storage/communications media.

Figure 6:
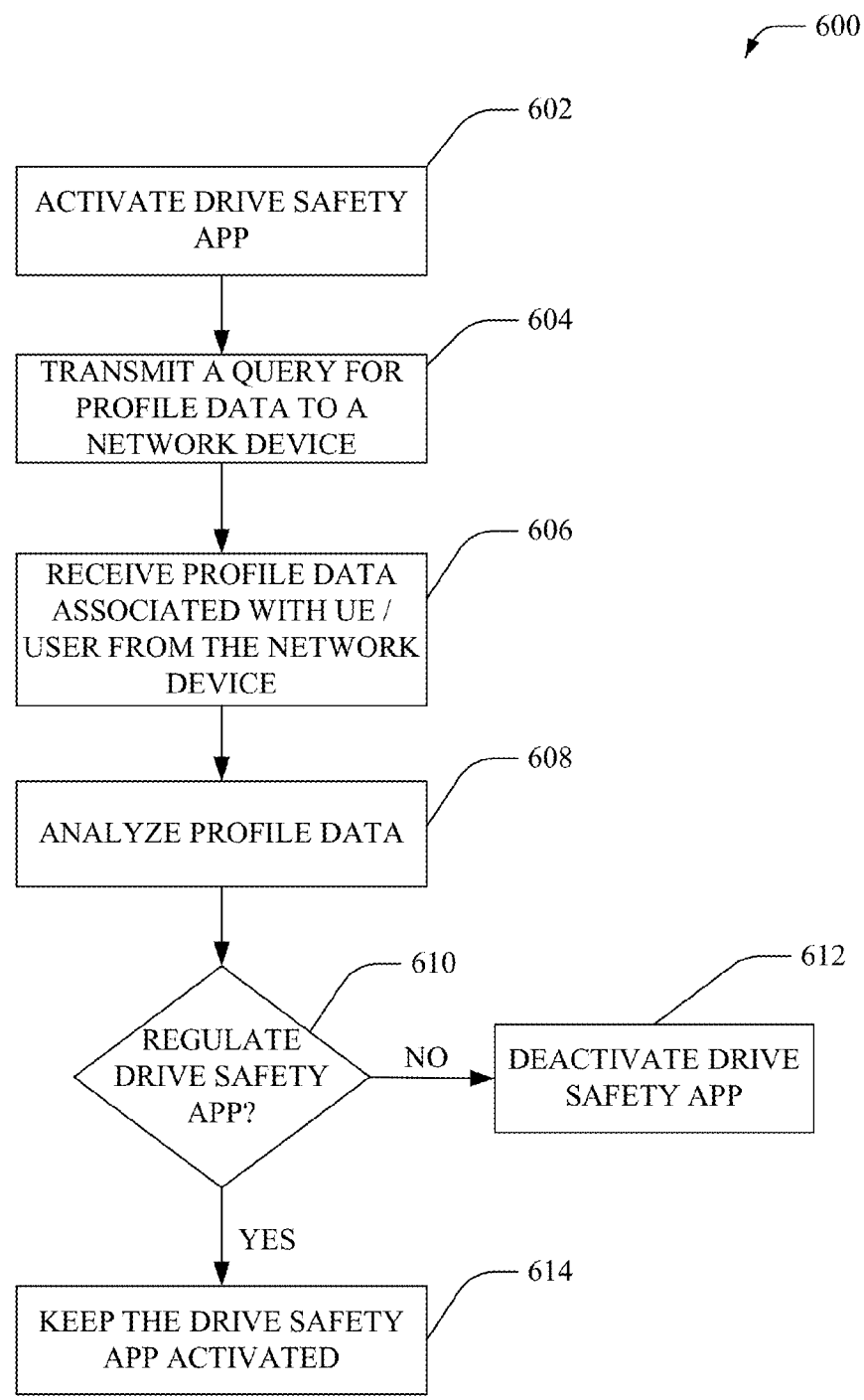
FIG. 6 illustrates an example method that facilitates controlling a drive safety app.

Referring now to FIG. 6, illustrated is an example method 600 that facilitates controlling a drive safety app, according to an aspect of the subject disclosure. As an example, method 600 can be implemented by a UE. Alternatively, at least a portion of method 600 can be implemented by one or more networked devices, e.g., of a cellular network. At 602, the drive safety app is activated. The drive safety app can be a native app installed on the UE that is employed to control (e.g., disable) features and/or other apps of the UE when determined that the user is driving a vehicle. Moreover, the drive safety app cannot be deleted, uninstalled, and/or deactivated by the user via a local interface (e.g., touch screen. mouse, keypad, etc.).

At 604, a query for profile data associated with the UE/user can be transmitted to a network device (e.g., cloud server). The query can include UE and/or user information, such as, but not limited to, phone number, identifiers, username, security credentials, etc. At 606, profile data associated with the UE/user can be received from the network device and at 608, the profile data can be analyzed. In one example, the profile data can include preferences set by a primary user, network provider, insurance provider, government agency, etc. At 610, it can be determined, based on the analysis whether the drive safety app is to be regulated. If not, at 612, the drive safety app can be deactivated. In this scenario, UE app and/or features are not controlled, for example, when user is determined to be driving the vehicle. Alternatively, if the drive safety app is to be regulated, at 614, the drive safety app is kept activated. As an example, a primary user can populate the profile data such that UEs utilized by a child or a minor are regulated whereas UEs utilized by a spouse or adult are not regulated.

Figure 7:
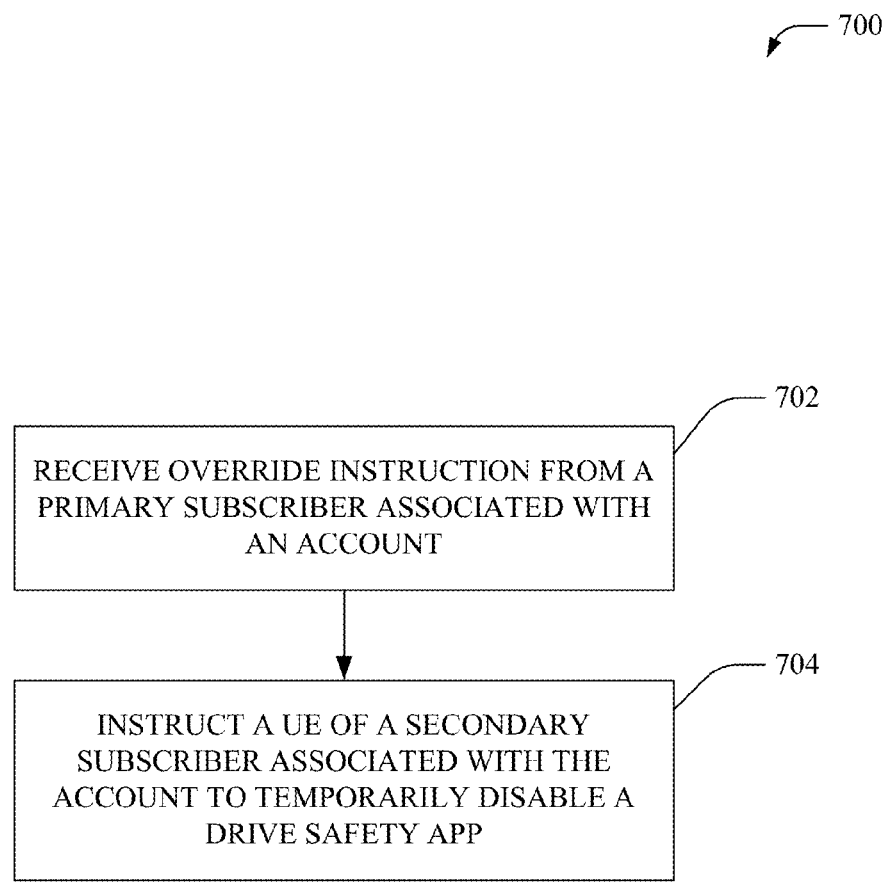
FIG. 7 illustrates an example method that facilitates central regulation of a drive safety app.

FIG. 7 illustrates an example method 700 that facilitates central regulation of a drive safety app, according to an aspect of the subject disclosure. As an example, method 700 can be implemented by one or more networked devices (e.g., cloud server) of a communication network (e.g., cellular network). Drive safety apps can be employed reduce distracted driving and prevent car accidents. In one example, the drive safety app can disable a set of apps or features of a UE in response to an event, for example, when determined that the user is driving a vehicle. Moreover, the user is prohibited from disabling the drive safety app and cannot modify the app from a local interface of the UE. In one aspect, the drive safety app can only be regulated by an authorized user (e.g., primary subscriber of an account) via a central management device. At 702, override instructions can be received from the primary subscriber. As an example, the primary subscriber can provide the instructions via an online portal (e.g., webpage), text message, instant message, voicemail, short message service (SMS) message, multimedia message service (MMS) message, email message, etc. On receiving the instructions, at 704, a UE of the secondary subscriber associated with the account can be instructed to temporarily disable the drive safety app. As an example, the instruction can be transmitted to the UE of the secondary subscriber via control signaling, a text message, an instant message, a SMS/MMS message, an email message, etc.

Figure 8:
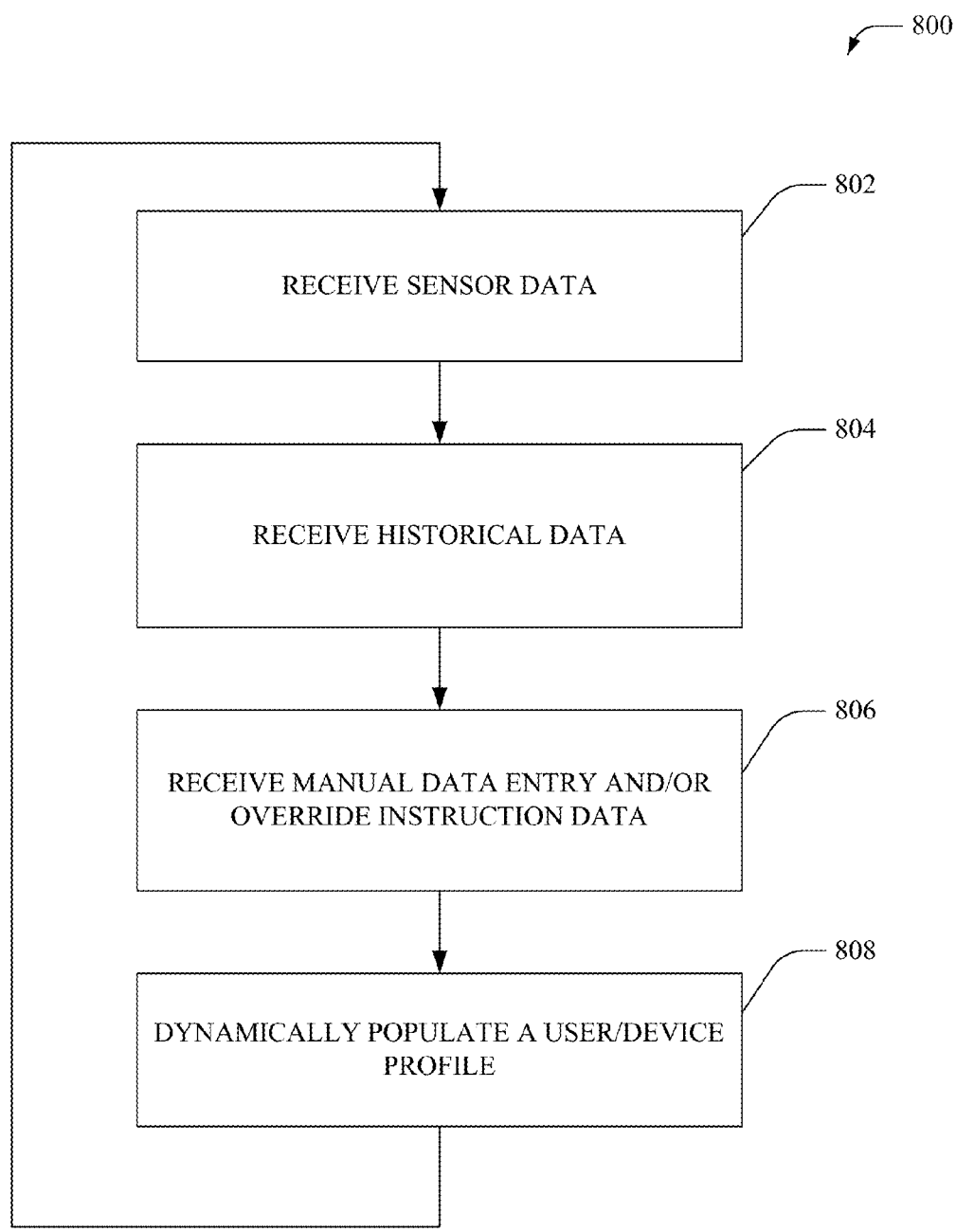
FIG. 8 illustrates an example method that facilitates populating user/device profile data that is employed to regulate mobile apps.

FIG. 8 illustrates an example method 800 that facilitates populating user/device profile data that is employed to regulate mobile apps, according to an aspect of the subject disclosure. As an example, method 800 can be implemented by one or more networked devices (e.g., cloud server) of a communication network (e.g., cellular network) for profiling during a learning phase. At 802, sensor data can be received from a UE. As an example, sensors can include, but are not limited to, motion sensors (e.g., accelerometer, gyroscope, barometer, etc.) that are embedded within the UE and supplementary sensors (e.g., GPS sensor, OBD connect sensor, a transceiver, etc.) that receive measured data from sources external to the UE. In addition to the sensed/measured data, data indicative of the device hardware (e.g., sensor specifications, identifiers, resolution, etc.) can also be received from the UE. Further, at 804, historical data can be received from the UE. As an example, historical data can include, but is not limited to, logged data and/or reports relating to user preferences and/or device/user behavior. It is noted that the sensor data and/or historical data can be continuously monitored and logged by the UE (e.g., as a background process) or can be collected and/or transmitted during a specific time period (e.g., in response to an event, when the UE is idle, when available network bandwidth is high, etc.). Further, at 808, manual data entry and/or override instructions can be received, for example, from an authorized primary user, via an online portal, text message, etc. For example, the manual data entry can provide preferences, such as, which UEs are to be regulated, a time period for regulation, a location or context during which the a UE is to be regulated, etc. Based on an analysis of the received data, trends and/or patterns can be identified. In addition, motion sensors of the UE can be calibrated based on the analysis. Accordingly, at 808, a user/device profile can be dynamically populated for the respective UEs with the received data, trend/pattern information, and/or calibration data.

Figure 9:
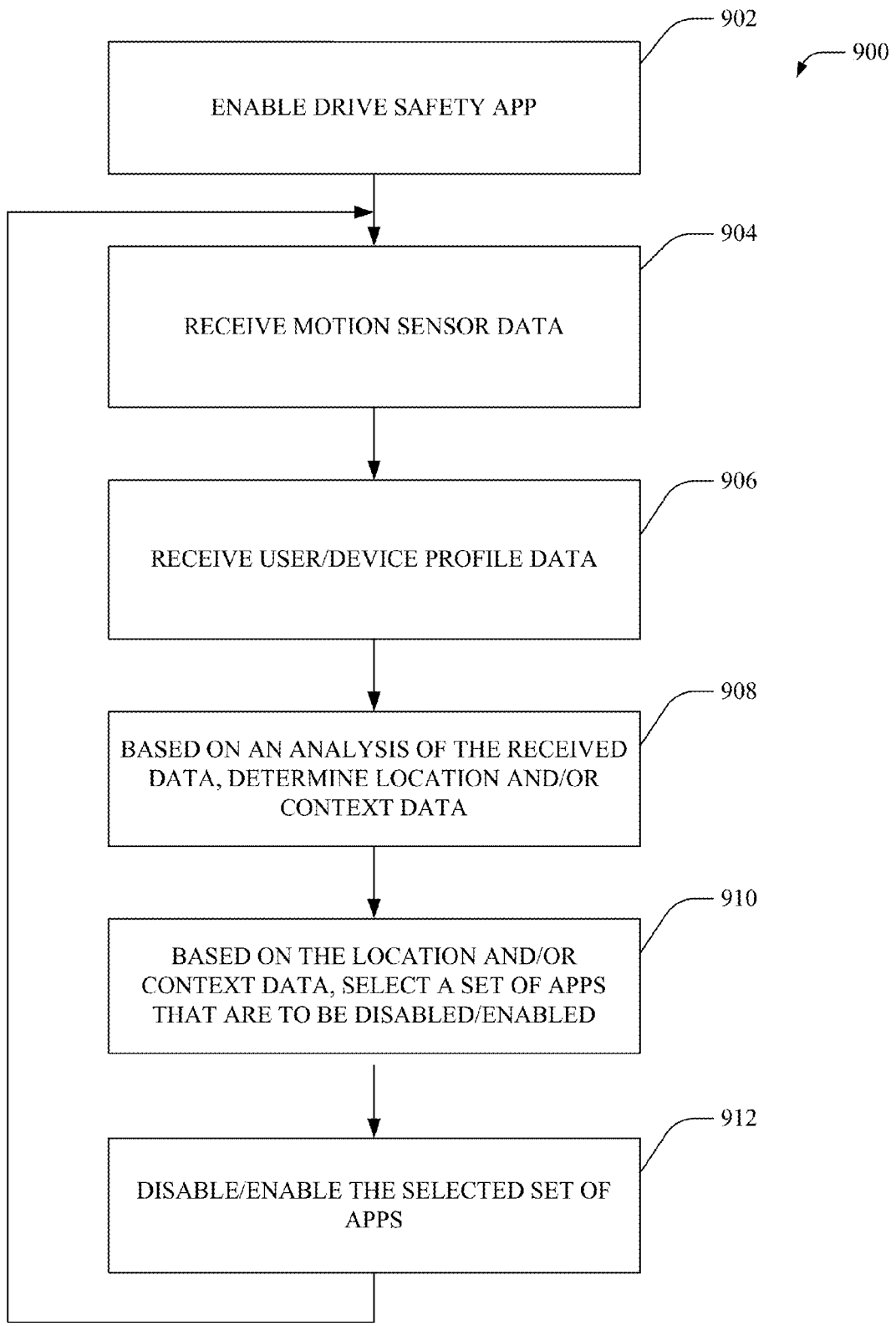
FIG. 9 illustrates an example method that facilitates employs profile data to enable/disable mobile apps.

FIG. 9 illustrates an example method 900 that employs profile data to enable/disable mobile apps, according to an aspect of the subject disclosure. As an example, method 900 can be implemented by a UE. Alternatively, at least a portion of method 900 can be implemented by one or more networked devices, e.g., of a cellular network. At 902, the drive safety app is enabled. Moreover, based on user/device profile received from a network device (e.g., cloud server), the UE can determine that the UE is to be regulated and accordingly, enable the drive safety app.

At 904, motion sensor data can be received. As an example, the motion sensor data can include data measured by device sensors, such as, but not limited to, accelerometer, gyroscope, barometer, etc. At 906, user/device profile data associated with the UE can be received from the network device (e.g., cloud server). As an example, the user/device profile data can include, but is not limited to, trending data, learned patterns, historical preferences, etc. At 908, based on an analysis of the received data, location and/or context data associated with the UE can be determined. In one aspect, the user/device profile data can be utilized to calibrate the device sensors to accurately determine (or determine with better resolution/granularity) UE location and/or context. Further, at 910, a set of app (or features) of the UE that are to be enabled/disabled are selected based on the location and/or context data. Furthermore, at 912, the selected apps (or features) can be enabled/disabled. For example, if determined that the user is driving a vehicle, a text messaging app can be disabled; however a navigation app can be enabled.

Figure 10:
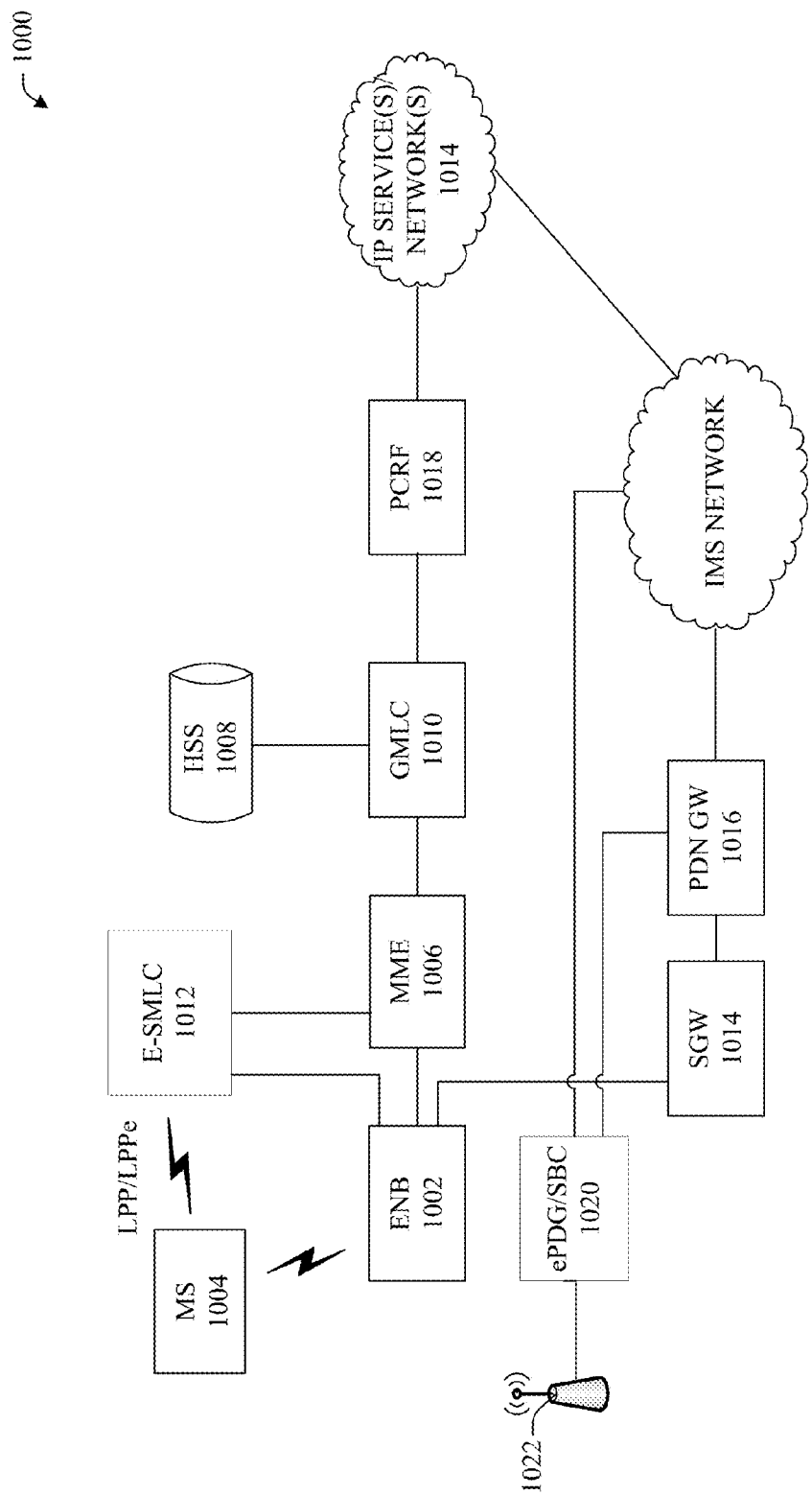
FIG. 10 illustrates a Long Term Evolution (LTE) network architecture that can employ the disclosed architecture.

FIG. 10 illustrates a high-level block diagram that depicts an example LTE network architecture 1000 that can employ the disclosed communication architecture. In one aspect, wireless network 304 and/or communication network 404 can include at least a portion of network 1000. The evolved RAN for LTE consists of an eNodeB (eNB) 1002 that can facilitate connection of MS 1004 to an evolved packet core (EPC) network. In one aspect, the MS 1004 is physical equipment or Mobile Equipment (ME), such as a mobile phone or a laptop computer that is used by mobile subscribers, with a Subscriber identity Module (SIM). The SIM includes an International Mobile Subscriber Identity (IMSI) and/or MSISDN, which is a unique identifier of a subscriber. The MS 1004 includes an embedded client that receives and processes messages received by the MS 1004. As an example, the embedded client can be implemented in JAVA. It is noted that MS 1004 can be substantially similar to UE 104 and/or UE 402, and can include functionality described with respect to UE 104 and UE 402 in systems 100-500.

The connection of the MS 1004 to the evolved packet core (EPC) network is subsequent to an authentication, for example, a SIM-based authentication between the MS 1004 and the evolved packet core (EPC) network. In one aspect, the MME 1006 provides authentication of the MS 1004 by interacting with the Home Subscriber Server (HSS) 1008 via a Gateway Mobile Location Centre (GMLC) 1010. The GMLC 1010 can request routing information from the HSS 1008. The HSS 1008 contains a subscriber profile and keeps track of which core network node is currently handling the subscriber. It also supports subscriber authentication and authorization functions (AAA). In networks with more than one HSS 1008, a subscriber location function provides information on the HSS 1008 that contains the profile of a given subscriber. In one aspect, this authentication can be utilized to secure population of the user/device profile data by a primary user. Further the MME 1006 can be coupled to an enhanced Serving Mobile Location Center (E-SMLC) 1012 supports location services (LCS) and coordinates positioning of the MS 1004. The MS 1004 and the E-SMLC can communicate using an LTE Positioning Protocol (LPP) and/or LPP extensions (LPPe)

As an example, the eNB 1002 can host a PHYsical (PHY), Medium Access Control (MAC), Radio Link Control (RLC), and Packet Data Control Protocol (PDCP) layers that include the functionality of user-plane header-compression and encryption. In addition, the eNB 1002 can implement at least in part Radio Resource Control (RRC) functionality (e.g., radio resource management, admission control, scheduling, cell information broadcast, etc.). The eNB 1002 can be coupled to a serving gateway (SGW) 1014 that facilitates routing of user data packets and serves as a local mobility anchor for data bearers when the MS 1004 moves between eNBs. The SGW 1014 can act as an anchor for mobility between LTE and other 3GPP technologies (GPRS, UMTS, etc.). When MS 1004 is in an idle state, the SGW 1014 terminates a downlink (DL) data path and triggers paging when DL data arrives for the MS 1004. Further, the SGW 1014 can perform various administrative functions in the visited network such as collecting information for charging and lawful interception. In one aspect, the SGW 1014 can be coupled to a Packet Data Network Gateway (PDN GW) 1016 that provides connectivity between the MS 1004 and external packet data networks such as IP service(s)/network(s) 1024 via the IP Multimedia Subsystem (IMS) network 1026. Moreover, the PDN GW 1016 is a point of exit and entry of traffic for the MS 1004. It is noted that the MS 1004 can have simultaneous connectivity with more than one PDN GW (not shown) for accessing multiple PDNs.

The PDN GW 1016 performs IP address allocation for the MS 1004, as well as QoS enforcement and implements flow-based charging according to rules from a Policy Control and Charging Rules Function (PCRF) 1018. The PCRF 1018 can facilitate policy control decision-making and control flow-based charging functionalities in a Policy Control Enforcement Function (PCEF), which resides in the PDN GW 1016. The PCRF 1018 can store data (e.g., QoS class identifier and/or bit rates) that facilitates QoS authorization of data flows within the PCEF. In one aspect, the PDN GW 1016 can facilitate filtering of downlink user IP packets into the different QoS-based bearers and perform policy enforcement, packet filtering for each user, charging support, lawful interception and packet screening. Further, the PDN GW 1016 acts as the anchor for mobility between 3GPP and non-3GPP technologies such as WiMAX and 3GPP2 (CDMA 1× and EvDO). An Evolved Packet Data Gateway (ePDG) 1020 is employed for communications between the EPC and untrusted non-3GPP networks that require secure access, such as a WiFi, LTE metro, and femtocell access networks, for example served by access point 1022.

Although an LTE network architecture 1000 is described and illustrated herein, it is noted that most any communication network architecture can be utilized to implement the disclosed embodiments.

Figure 11:
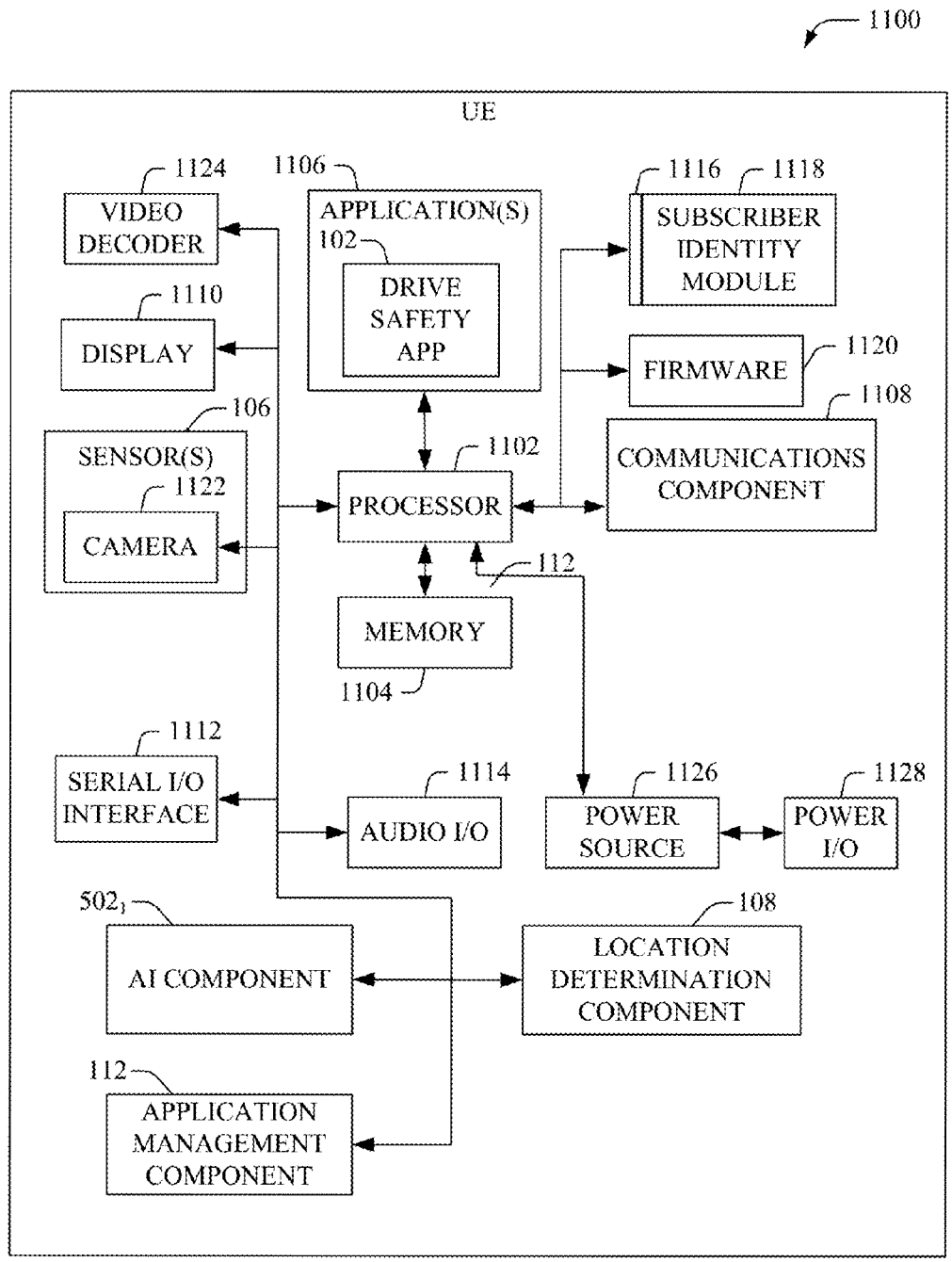
FIG. 11 an example block diagram of a user equipment (UE) utilized to reduce distracted driving.

Referring now to FIG. 11, there is illustrated a block diagram of an UE 1100 utilized for mobile app and device feature regulation in accordance with the subject specification. Moreover, the UE 104, UE 402, and/or MS 1004 can include at least a portion of the UE 1100. In one aspect, the UE 1100 can include a processor 1102 for controlling all onboard operations and processes. A memory 1104 can interface to the processor 1102 for storage of data and one or more applications 1106 (e.g., including the drive safety app 102) being executed by the processor 1102. A communications component 1108 can interface to the processor 1102 to facilitate wired/wireless communication with external systems (e.g., other vehicles, access points, network servers, etc.).

The UE 1100 can include a display 1110 for displaying received content (and/or content to be transferred) and/or for displaying text information related to operating and using the device features. A serial I/O interface 1112 is provided in communication with the processor 1102 to facilitate serial communication (e.g., USB, and/or IEEE 1194) via a hardwire connection. Audio capabilities are provided with an audio I/O component 1114, which can include a speaker for the output of audio signals related to, for example, recorded data or telephony voice data, and a microphone for inputting voice commands.

Additionally or optionally, the UE 1100 can include a slot interface 1116 for accommodating a subscriber identity module (SIM) 1118. Firmware 1120 is also provided to store and provide to the processor 1102 startup and operational data. The UE 1100 can also include sensors 106 comprising a camera 1122 and/or a video decoder 1124 for decoding encoded multimedia content. Further, the UE 1100 can include a power source 1126 in the form of batteries, which power source 1126 can interface to an external power system or charging equipment via a power I/O component 1128. In addition, the UE 1100 can include the location determination component 108, app management component 112, and the AI component $502_1$, which can be stored in memory 1104 and/or implemented by an application 1106, can include respective functionality, as more fully described herein, for example, with regard to systems 100-500.

Figure 12:
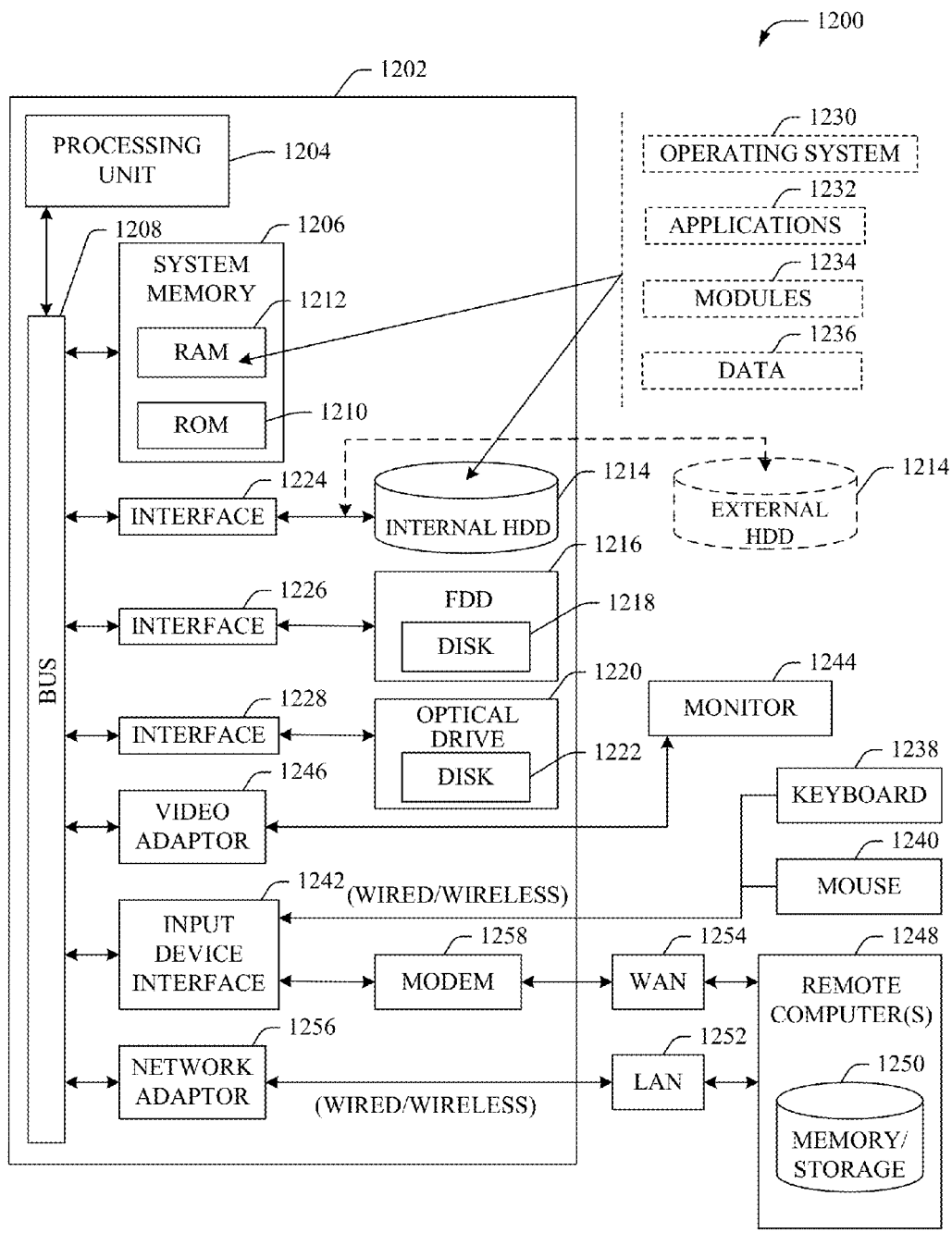
FIG. 12 illustrates a block diagram of a computer operable to execute the disclosed communication architecture.

Referring now to FIG. 12, there is illustrated a block diagram of a computer 1202 operable to execute the disclosed communication architecture. In order to provide additional context for various aspects of the disclosed subject matter, FIG. 12 and the following discussion are intended to provide a brief, general description of a suitable computing environment 1200 in which the various aspects of the specification can be implemented. While the specification has been described above in the general context of computer-executable instructions that can run on one or more computers, those skilled in the art will recognize that the specification also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the specification can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various aspects of the specification includes a computer 1202, the computer 1202 including a processing unit 1204, a system memory 1206 and a system bus 1208. As an example, the component(s), application(s) server(s), equipment, system(s), interface(s), gateway (s), and/or device(s) (e.g., drive safety app 102, UE 104, sensors 106, location determination component 108, app management component 112, profile component 302, data store 308, UE 402, and AI components $502_1$-$502_2$) disclosed herein with respect to systems 100-600 and 1000-1100 can each include at least a portion of the computer 1202. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1210 and random access memory (RAM) 1212. A basic input/output system (BIOS) is stored in a non-volatile memory 1210 such as ROM, EPROM, EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214, which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1394 interface technologies. Other external drive connection technologies are within contemplation of the subject disclosure.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to a HDD, a removable magnetic diskette, and a removable optical media such as a CD or DVD, it should be appreciated by those skilled in the art that other types of storage media which are readable by a computer, such as zip drives, magnetic cassettes, flash memory cards, solid-state disks (SSD), cartridges, and the like, can also be used in the example operating environment, and further, that any such storage media can contain computer-executable instructions for performing the methods of the specification.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is appreciated that the specification can be implemented with various commercially available operating systems or combinations of operating systems.

A user can enter commands and information into the computer 1202 through one or more wired/wireless input devices, e.g., a keyboard 1238 and/or a pointing device, such as a mouse 1240 or a touchscreen or touchpad (not illustrated). These and other input devices are often connected to the processing unit 1204 through an input device interface 1242 that is coupled to the system bus 1208, but can be connected by other interfaces, such as a parallel port, an IEEE 1394 serial port, a game port, a USB port, an IR interface, etc. A monitor 1244 or other type of display device is also connected to the system bus 1208 via an interface, such as a video adapter 1246.

The computer 1202 can operate in a networked environment using logical connections via wired and/or wireless communications to one or more remote computers, such as a remote computer(s) 1248. The remote computer(s) 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 is connected to the local network 1252 through a wired and/or wireless communication network interface or adapter 1256. The adapter 1256 can facilitate wired or wireless communication to the LAN 1252, which can also include a wireless access point disposed thereon for communicating with the wireless adapter 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 via the serial port interface 1242. In a networked environment, program modules depicted relative to the computer 1202, or portions thereof, can be stored in the remote memory/storage device 1250. It will be appreciated that the network connections shown are example and other means of establishing a communications link between the computers can be used.

The computer 1202 is operable to communicate with any wireless devices or entities operatively disposed in wireless communication, e.g., desktop and/or portable computer, server, communications satellite, etc. This includes at least WiFi and Bluetooth™ wireless technologies or other communication technologies. Thus, the communication can be a predefined structure as with a conventional network or simply an ad hoc communication between at least two devices.

WiFi, or Wireless Fidelity networks use radio technologies called IEEE 802.11 (a, b, g, n, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Figure 13:
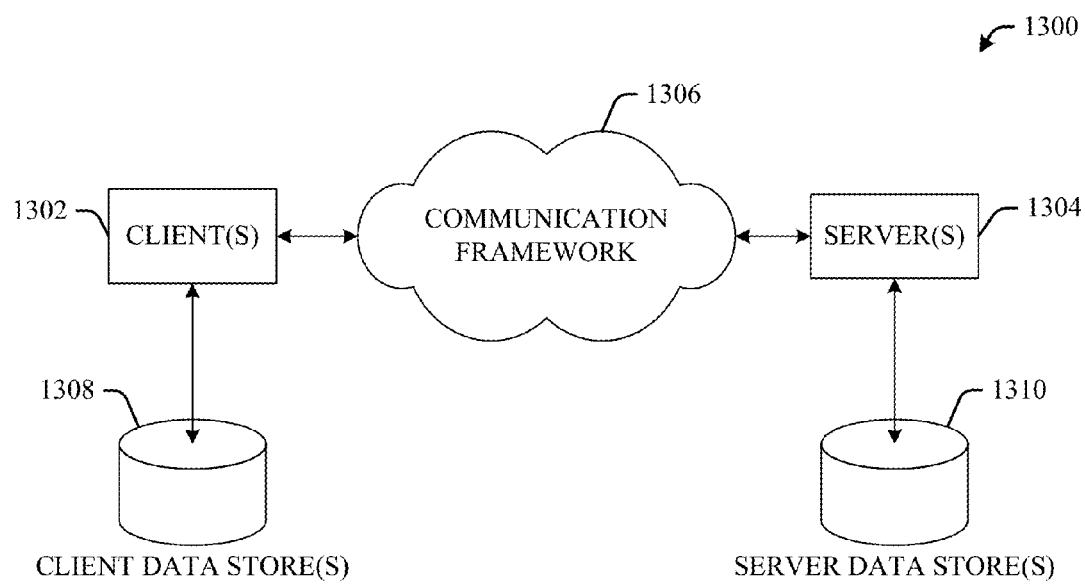
FIG. 13 illustrates a schematic block diagram of a computing environment in accordance with the subject specification

Referring now to FIG. 13, there is illustrated a schematic block diagram of a computing environment 1300 in accordance with the subject specification. The system 1300 includes one or more client(s) 1302. The client(s) 1302 can be hardware and/or software (e.g., threads, processes, computing devices).

The system 1300 also includes one or more server(s) 1304. The server(s) 1304 can also be hardware and/or software (e.g., threads, processes, computing devices). The servers 1304 can house threads to perform transformations by employing the specification, for example. One possible communication between a client 1302 and a server 1304 can be in the form of a data packet adapted to be transmitted between two or more computer processes. The data packet may include a cookie and/or associated contextual information, for example. The system 1300 includes a communication framework 1306 (e.g., a global communication network such as the Internet, cellular network, etc.) that can be employed to facilitate communications between the client(s) 1302 and the server(s) 1304.

Communications can be facilitated via a wired (including optical fiber) and/or wireless technology. The client(s) 1302 are operatively connected to one or more client data store(s) 1308 that can be employed to store information local to the client(s) 1302 (e.g., cookie(s) and/or associated contextual information). Similarly, the server(s) 1304 are operatively connected to one or more server data store(s) 1310 that can be employed to store information local to the servers 1304.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A user equipment, comprising:
a processor; and
a memory that stores executable instructions that, when executed by the processor, facilitate performance of operations, comprising:
during a first time period, receiving first motion data from a first sensor of the user equipment and supplementary data from a second sensor associated with the user equipment, wherein the first motion data indicative of a speed of the user equipment, and wherein the supplementary data supplements the first motion data to determine context data associated with the user equipment;
based on the first motion data and the supplementary data, determining profiling data associated with a context of the user equipment, wherein the profiling data is directed to a network storage device, and
during a second time period, utilizing the profiling data to calibrate second motion data received from the first sensor, wherein the second sensor is unavailable during the second time period.

2. The user equipment of claim 1, wherein the operations further comprise:
based on an analysis of the profiling data and the second motion data, determining location data indicative of a geographical location of the user equipment.

3. The user equipment of claim 2, wherein the context data comprises first context data and the operations further comprise:
based on the analysis, determining second context data associated with the user equipment.

4. The user equipment of claim 3, wherein the operations further comprise:
based on the location data and the second context data, determining that an application executed via the user equipment is to be enabled.

5. The user equipment of claim 3, wherein the operations further comprise:
based on the location data and the second context data, determining that an application executed via the user equipment is to be disabled.

6. The user equipment of claim 5, wherein the operations further comprise:
based on the location data and the second context data, determining a time period for which the application is disabled.

7. The user equipment of claim 5, wherein the operations further comprise:
receiving, from the network storage device, override data that instructs the user equipment to prohibit disabling of the application, and wherein the override data is transmitted to the network device by an authorized device via a web server.

8. The user equipment of claim 5, wherein the operations further comprise:
determining hardware data associated with the first sensor, and wherein the determining that the application of the user equipment is to be disabled comprises determining that the application of the user equipment is to be disabled based on the hardware data.

9. The user equipment of claim 5, wherein the determining that the application of the user equipment is to be disabled comprises determining that the application of the user equipment is to be disabled based on determining that a subscriber of the user equipment is driving a vehicle.

10. The user equipment of claim 1, wherein the profiling data is determined based on preference data associated with the user equipment.

11. The user equipment of claim 1, wherein the profiling data is determined based on historical data associated with the user equipment.

12. The user equipment of claim 1, wherein the first sensor comprises an accelerometer.

13. The user equipment of claim 1, wherein the operations further comprise:
directing the profiling data to the network device.

14. A method, comprising:
during a first time period, sensing, by a mobile device comprising a processor, first motion data indicative of a first speed of the mobile device, wherein the first motion data is combined with supplementary data that supplements the first motion data to generate profile data associated with the mobile device that is to be stored within a network device of a communication network coupled to the mobile device, and wherein the supplementary data is sensed by a sensor associated with the mobile device;
during a second time period, sensing, by the mobile device, second motion data indicative of a second speed of the mobile device;
subsequent to the sensing the second motion data and in response to determining that the sensor is inaccessible, receiving, by the mobile device, the profile data from the network device; and
based on the profile data, calibrating, by the mobile device, the second motion data.

15. The method of claim 14, further comprising:
in response to determining that the profile data and the second motion data satisfy a defined criterion, disabling, by the mobile device, an application of the mobile device.

16. The method of claim 15, wherein the disabling comprises disabling the application in response to determining that a user identity associated with the mobile device is also associated with driving a vehicle.

17. A non-transitory machine-readable storage medium, comprising executable instructions that, when executed by a processor of a communication device, facilitate performance of operations, comprising:
based on first sensor data received from a first sensor of the communication device during a first time period, determining first motion data related to a speed of the communication device;
utilizing first motion data and supplementary data that supplements the first motion data to determine profile data associated with the user equipment, wherein the supplementary data has been received from a second sensor associated with the communication device;
based on the profile data, calibrating second motion data that is determined based on second sensor data received from the first sensor during a second time period, wherein the second sensor is unavailable during the second time period; and
in response to determining that the second motion data satisfies a defined criterion, determining that an application of the communication device is to be deactivated.

18. The non-transitory machine-readable storage medium of claim 17, wherein the operations further comprise:
receiving, from a network device, override data that instructs the communication device to deny deactivation of the application.

19. The non-transitory machine-readable storage medium of claim 17, wherein the determining that the application is to be deactivated comprises determining that the application is to be deactivated in response to determining that a user of the communication device is driving a vehicle.

20. The non-transitory machine-readable storage medium of claim 17, wherein the first sensor is an accelerometer.

* * * * *